Nov. 6, 1956 C. W. TITTLE 2,769,915
EPITHERMAL NEUTRON DETECTOR
Filed Oct. 2, 1952
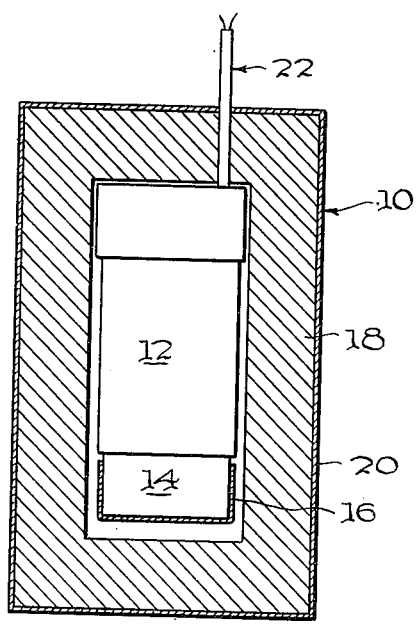
INVENTOR.
CHARLES W. TITTLE
BY
ATTORNEY United States Patent Office 2,769,915
Patented Nov. 6, 1956

2,769,915
EPITHERMAL NEUTRON DETECTOR

Charles W. Tittle, Oakmont, Pa., assignor to Gulf Research & Development Company, Pittsburgh, Pa., a corporation of Delaware Application October 2, 1952, Serial No. 312,680

3 Claims. (Cl. 250—71.5)

The present invention relates to new and useful improvements in neutron detecting apparatus, and more particularly to such apparatus of the scintillation type having high and selective sensitivity for neutrons of epithermal energies.

The invention herein disclosed relates to somewhat similar subject matter disclosed in my copending U. S. application Serial No. 312,679, entitled Coincidence-Type Slow Neutron Detector, and filed of even date. This application and said copending application are assigned to a common assignee.

The paramount aims of the invention are to provide a neutron detector having its maximum sensitivity for incident neutrons of epithermal energy, and which is substantially insensitive to incident gamma-rays, alpha particles, beta particles, and fast neutrons; and to provide an arrangement of photomultiplier tube, phosphor and a foil-of-metal of the epithermal-neutron resonance type, which will utilize the foil-of-metal to implement the gathering of scintillations produced in the phosphor upon the photosensitive cathode of the photomultiplier tube.

Briefly, the invention comprises a gamma-ray-sensitive scintillation phosphor optically coupled to a photomultiplier tube, a foil-of-metal of the type that is reactive with epithermal neutrons to produce gamma-rays disposed adjacent the phosphor so as to activate the latter. The arrangement is such that an epithermal neutron passing into the foil-of-metal will react therewith to produce a gamma-ray, such gamma-ray then passing into the phosphor to produce a scintillation, which in turn activates the photomultiplier tube to produce a pulse of electrical energy. Such pulses of electrical energy may be counted and recorded as a measure of epithermal neutron flux reacting with the foil-of-metal.

The foil-of-metal is disposed to partially surround the phosphor so that gamma-ray-producing events in the metal will be most effective to produce scintillations in the phosphor, and such foil-of-metal is arranged to reflect scintillations towards the photomultiplier tube to enhance the optical efficiency of the device.

The invention also utilizes a thermal-neutron shield surrounding the foil-of-metal, phosphor and photomultiplier tube to intercept incident thermal neutrons and avoid thermal-neutron flux causing actuation of the photomultiplier tube to produce electrical pulses. A gamma-ray shield surrounds the foil-of-metal, the phosphor and the photomultiplier tube to substantially exclude extraneous gamma-rays therefrom and also to serve to exclude relatively non-penetrating particles such as alpha particles and beta particles from such elements. Since thermal-neutron interception by the thermal-neutron shield usually involves the production of gamma-rays, the thermal-neutron shield surrounds the gamma-ray shield so that the latter attenuates such rays proceeding towards the elements surrounded thereby.

The accompanying drawing illustrates the preferred form of the invention, such drawing showing the photomultiplier tube and the phosphor in side elevation with the foil-of-metal and the surrounding gamma-ray and thermal-neutron shields being shown in central vertical section.

The reference numeral 10 designates the epithermal-neutron detector generally, the same comprising a conventional photomultiplier tube or photosensitive element 12 and a scintillation phosphor 14 disposed adjacent the photosensitive cathode, not shown, of the photomultiplier tube 12.

The scintillation phosphor 14 is composed of a material sensitive to gamma-rays to produce scintillations which pass onto the photosensitive cathode of the photomultiplier tube 12 to cause the latter to produce electrical pulses. The scintillation phosphor may be composed of alkali halides containing traces of thallium, such as NaI(TlI), calcium tungstate (scheelite), or certain organic compounds having the property of being transparent to the scintillations produced therein, such as naphthalene, anthracene, chrysene and stilbene.

A cup-shaped foil-of-metal 16 is disposed adjacent the phosphor 14, and as clearly shown in the drawing surrounds substantially all sides of the phosphor 14 except that side of the phosphor 14 to which the photomultiplier tube 12 is exposed.

The foil-of-metal 16 is composed of or at least includes an element of the type that reacts with neutrons of epithermal energies to produce gamma-rays, and which element has a resonance peak for such reaction with neutrons of epithermal energies. By epithermal neutrons is meant neutrons possessing energies lying within the interval of from about 0.2 electron volts to a few hundred electron volts.

There are a number of elements, especially those of atomic weight exceeding about 100, that exhibit such resonance peaks with epithermal neutrons, examples of which are rhodium (1.3 e. v.), silver (5.3 e. v.), indium (1.4 e. v.), and gold (4.8 e. v.). In the claims, the expression "neutron-gamma reactive" denotes such substances that react with neutrons to produce gamma-rays. It is a desideratum of the element chosen that the same possesses a low cross section for fast neutrons. In the preferred form of the invention, the foil-of-metal 16 is of indium and is preferably about three to five thousandths of an inch thick.

In the event that the phosphor 14 is at least semi-transparent to scintillations produced therein by gamma-rays, it is preferred that the surface of the foil-of-metal 16 adjacent the phosphor 14 be bright or polished by any surface treatment necessary so as to be optically reflective of the scintillations produced in the phosphor. It will be obvious upon inspection of the drawing that under such an arrangement a portion of scintillation energy will pass from the phosphor 14 to such optically reflective surface of the foil-of-metal 16 and be reflected through the phosphor 14 towards the photomultiplier tube 12, and that such portion of energy being thus utilized increases the sensitivity of the device. It is within the concept of the invention that the mirror function of the foil-of-metal 16 may be enhanced by modifying the shape of the foil-of-metal, such as into a paraboloid, hemisphere, or a trihedron. It will be understood that selection of an optimum shape of the foil-of-metal 16 will be indicated under particular circumstances by the shape and nature of the phosphor 14 used, and the relative size and spatial arrangement of the phosphor 14 and the photosensitive cathode of the photomultiplier tube 12.

Surrounding the photomultiplier tube 12, the phosphor 14 and the foil-of-metal 16 is a gamma-ray shield 18. Lead is an excellent material for forming the shield 18; however, other materials such as tungsten, high tungsten alloys and bismuth may be used for the desired purpose.

Materials such as those suggested for the shield 18 are of high atomic weight and therefore reduce neutron energies to a negligible extent in so far as the purposes of the invention are concerned.

The gamma-ray shield 18 is in turn surrounded by a thermal-neutron shield 20. Such shield 20 is formed of a material that includes an element having a high absorption cross section for thermal neutrons while having a relatively low absorption cross section for epithermal neutrons, especially such neutrons of energy corresponding to the resonance peak of the foil-of-metal 16. Various elements have high absorption cross sections for neutrons of thermal energies, particularly cadmium which is preferred, and the rare earth elements gadolinium and dysprosium. Although boron and lithium have high absorption cross sections for thermal neutrons, these elements are not recommended for the shield 20 as their absorption cross sections drop rather slowly with increasing neutron energies so as to absorb many epithermal neutrons that would otherwise reach and react with the foil-of-metal 16. In the preferred embodiment, the shield 20 is a sheet or layer of cadmium of about two hundreds of an inch in thickness. Cadmium enriched in $Cd^{113}$ will permit the use of lesser thickness.

It is to be noted that the gamma-ray shield 18 is effective to shield the photomultiplier 12, the phosphor 14 and the foil-of-metal 16 from gamma-rays produced by interaction of the shield 20 and thermal neutrons, as well as from gamma-rays from other extraneous sources.

Indicated generally at 22 is a multiple-conductor electrical conduit that is connected to the photomultiplier tube 12, and which extends outwardly therefrom through the shields 18 and 20. Through the conduit 22, the photomultiplier tube 12 may be energized by a conventional electric circuit for this purpose, not shown, and pulses produced by the photomultiplier tube 12 may be conducted to conventional apparatus, also not shown, for counting and recording.

From the foregoing, it will be seen that the novel arrangement of the foil-of-metal 16 and the phosphor 14 in relation to the photomultiplier tube 12 lends the important advantages that the non-planar shape of the foil-of-metal 16 presents a large area for neutron interception irrespective of the direction of neutron travel, the foil-of-metal 16 by reason of partially surrounding the phosphor 14 enables efficient conversion of gamma-ray energy produced therein to scintillation energy produced in the phosphor, and the foil-of-metal 16 reflects scintillation energy towards the photomultiplier tube 12 that would otherwise be lost thereto.

The concept of interposing a gamma-ray shield 18 between the foil-of-metal 16 having a strong resonance peak for epithermal neutrons and a surrounding thermal neutron shield 20 having a relatively very strong capacity to absorb neutrons of energies less than those of the resonance peak of the foil-of-metal 16, is of importance in that substantially only epithermal neutrons may cause a gamma-ray producing event in the foil-of-metal 16 and for the further reason that only gamma-rays so produced may effect scintillations in the phosphor 14. These results stem from the fact that thermal neutrons or at least neutrons having lower energies than those sought to be detected may be excluded from the foil-of-metal 16 by an appropriate selection of material for the shield 20. Extraneous gamma-rays as well as gamma-rays produced in the shield 20 are excluded from the phosphor 14 by the shield 18. Epithermal neutrons and fast neutrons pass substantially freely through the shields 18 and 20, while essentially only such epithermal neutrons cause gamma-ray producing events in the foil-of-metal 16.

It should be amply clear from the above that the selection of material for the foil-of-metal 16 and shield 20 will be influenced by the material used for the other, the essential relation being that the shield 20 should be fairly transparent to epithermal neutrons of the resonance peak of the foil-of-metal 16 and substantially opaque to neutrons of less energy than such resonance peak. As mentioned previously, a preferred selection of materials bearing such essential relation is cadmium that strongly absorbs neutrons of 0.176 e. v. and less energy for the shield 20, and indium having a pronounced resonance peak at 1.4 e. v. for the foil-of-metal 16.

The invention has been described in considerable detail in order to convey a full appreciation and understanding thereof, and not in the interest of encumbering the scope of the invention with detail, the actual scope of the invention being defined in the appended claims.

What I claim as my invention is:

1. In an epithermal-neutron detecting device, a neutron-gamma reactive material that includes nuclei of an element having a resonance peak for such reaction with neutrons of epithermal energy selected from the group consisting of indium, silver, rhodium and gold, a gamma-ray-responsive scintillation phosphor adjacent said material, a photomultiplier tube opticaly coupled to the phosphor, and a gamma-ray shield surrounding the material, the phosphor, and the photomultiplier tube, to attenuate background gamma-rays.

2. In an epithermal-neutron detecting device, a neutron-gamma reactive material that includes nuclei of an element having a resonance peak for such reaction with neutrons of epithermal energy selected from the group consisting of indium, silver, rhodium and gold, a gamma-ray-responsive scintillation phosphor adjacent said material, a photomultiplier tube optically coupled to the phosphor, a gamma-ray shield surrounding the material, the phosphor, and the photomultiplier tube, and a thermal neutron shield surrounding said gamma-ray shield, said thermal neutron shield comprising nuclei of an element selected from the group consisting of cadmium, gadolinium and dysprosium having a maximum cross section for neutrons having energies less than the neutron energy corresponding to the resonance peak of the first-mentioned nuclei.

3. In an epithermal-neutron detecting device, an indium foil and a gamma-ray-responsive scintillation phosphor adjacent thereto, a photomultiplier tube optically coupled to said phosphor, a lead shield surrounding the foil, the phosphor, and the photomultiplier tube, and a cadmium shield surrounding the lead shield.

References Cited in the file of this patent

UNITED STATES PATENTS

| | | |
|---|---|---|
| 2,206,634 | Fermi et al. | July 2, 1940 |
| 2,274,900 | Kallmann | Mar. 3, 1942 |
| 2,508,772 | Pontecorvo | May 23, 1950 |
| 2,550,106 | Coltman et al. | Apr. 24, 1951 |
| 2,666,145 | Eversole et al. | Jan. 12, 1954 |

OTHER REFERENCES

"Solid Counters: Scintillation Counters"—Wouters AECD 2203, Aug. 5, 1948, pp. 1–9.

"Radioactivity and Nuclear Physics"—Cork 2nd edition 1950, published by Van Nostrand Co. Inc., p. 121, pp. 220–230

"A Scintillation Counter for Thermal Neutrons"—Draper Rev. of Sci. Inst., vol. 22, #7, July, 1951, p. 543